UNITED STATES PATENT OFFICE 2,377,147

β,β'-IMINODIPROPIONIMIDE

Roy S. Hanslick, Philadelphia, Pa., assignor to American Cyanamid Company, New York, N. Y., a corporation of Maine No Drawing. Application October 27, 1942, Serial No. 463,551

1 Claim. (Cl. 260—239)

The present invention relates to β,β'-iminodipropionimide, a new compound which is of particular interest as an intermediate in the preparation of nitrogen-containing resins.

The following example, in which the parts are by weight, illustrates a specific method of preparing the above compound in accordance with the invention.

Example

A solution consisting of 80 parts of sodium hydroxide dissolved in 150 parts of water was heated to boiling in a 3-neck vessel equipped with a reflux condenser, dropping funnel and stirrer. 123 parts of β,β'-dicyanodiethylamine were added dropwise to the boiling caustic solution during a period of 1 hour. Ammonia gas was continually given off during the addition of the amine. Heating was continued for 1 and ½ hours. The solution was cooled and made slightly acid by the addition of sulfuric acid (1:1). The precipitate was filtered off and the filtrate evaporated, leaving a residue which was treated with glacial acetic acid to dissolve any amino or acidic compounds. Methyl alcohol was added to the cold acetic acid solution to precipitate iminodipropionic acid. The clear filtrate was allowed to stand at 0° C. for a few hours to check for further crystallization of iminodipropionic acid. Methyl alcohol and acetic acid were then removed by vacuum distillation, leaving a viscous liquid which was taken up in hot methyl alcohol. The solution was cooled to 0°–5° C. to crystallize the β,β'-iminodipropionimide, a white crystalline product having a melting point of 175°–176° C. Nitrogen analysis: found, 19.34%; theory, 19.70%.

β,β'-iminodipropionimide is readily soluble in water, very slightly soluble in benzene and toluene, and insoluble in ether, ethyl alcohol, acetone, carbon tetrachloride, heptane, dioxane, tetralin, and pyridine.

While the invention has been described with particular reference to specific embodiments, it is to be understood that it is not to be limited thereto but is to be construed broadly and restricted solely by the scope of the appended claim.

I claim:

β,β'-iminodipropionimide.

ROY S. HANSLICK.